(12) United States Patent
Motowaki (10) Patent No.: US 10,688,747 B2
(45) Date of Patent: Jun. 23, 2020

(54) AUTOMATIC CLEANER AND PRESSING DEVICE

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 58 days.

(21) Appl. No.: 16/175,842

(22) Filed: Oct. 31, 2018

(65) Prior Publication Data

US 2019/0151929 A1 May 23, 2019

(30) Foreign Application Priority Data

Nov. 22, 2017 (JP) .................. 2017-224586

(51) Int. Cl.
| | |
|---|---|
| *B30B 15/00* | (2006.01) |
| *B21D 45/04* | (2006.01) |
| *B21J 13/14* | (2006.01) |
| *B21D 43/00* | (2006.01) |
| *B08B 1/00* | (2006.01) |
| *B21D 28/00* | (2006.01) |
| *B08B 7/04* | (2006.01) |
| *B02B 1/02* | (2006.01) |
| *B23Q 11/00* | (2006.01) |

(Continued)

(52) U.S. Cl.
CPC ............ *B30B 15/0082* (2013.01); *B02B 1/02* (2013.01); *B08B 1/008* (2013.01); *B08B 7/04* (2013.01); *B21D 43/003* (2013.01); *B21D 45/04* (2013.01); *B21J 13/14* (2013.01); *B23P 19/00* (2013.01); *B23Q 11/00* (2013.01); *B30B 7/04* (2013.01); *B21D 28/002* (2013.01); *B23P 11/00* (2013.01); *B23P 19/02* (2013.01)

(58) Field of Classification Search
CPC ....... B30B 15/0082; B08B 1/00; B08B 1/002; B08B 1/008; B08B 1/02; B08B 5/00; B08B 5/02; B08B 5/023; B08B 7/04; B21D 45/02; B21D 45/04; B21D 43/003; B21D 43/027; B21D 37/00–205
USPC ................................................ 15/246, 256.5
See application file for complete search history.

(56) References Cited

U.S. PATENT DOCUMENTS

| 3,295,351 A | 1/1967 | Jacobs | |
|---|---|---|---|
| 7,360,271 B2 * | 4/2008 | Nordstrom ................ | B08B 1/04 15/104.05 |
| 2016/0263745 A1 * | 9/2016 | Shirahata ............... | B25J 9/1697 |

FOREIGN PATENT DOCUMENTS

| JP | S52-62332 U | 5/1977 |
|---|---|---|
| JP | S59-191598 A | 10/1984 |

(Continued)

*Primary Examiner* — Shelley M Self
*Assistant Examiner* — Katie L. Parr
(74) *Attorney, Agent, or Firm* — Hauptman Ham, LLP (57) ABSTRACT

An automatic cleaner for a pressing device has a pressing unit that can reciprocate between a pressing position and an apart position. The automatic cleaner includes a separating structure configured to separate a workpiece from the pressing unit; a cleaning member; and a drive mechanism configured to move the separating structure and the cleaning member back and forth, in accordance with movement of the pressing unit. The drive mechanism is configured to make the separating structure drop the workpiece, after being worked, from the pressing unit, and to make the cleaning member clean the pressing unit, in accordance with the movement of the pressing unit.

12 Claims, 5 Drawing Sheets

(51) Int. Cl.
*B30B 7/04* (2006.01)
*B23P 19/00* (2006.01)
*B23P 19/02* (2006.01)
*B23P 11/00* (2006.01)

(56) References Cited

FOREIGN PATENT DOCUMENTS

| | | |
|---|---|---|
| JP | S61-1946 Y2 | 1/1986 |
| JP | H6-48928 U | 7/1994 |
| JP | H6-49397 Y2 | 12/1994 |
| JP | H8-174110 A | 7/1996 |
| JP | 2009-12019 A | 1/2009 |

* cited by examiner

AUTOMATIC CLEANER AND PRESSING DEVICE

RELATED APPLICATIONS

The present application claims priority of Japanese Application Number 2017-224586, filed on Nov. 22, 2017, the disclosure of which is hereby incorporated by reference herein in its entirety.

BACKGROUND OF THE INVENTION

1. Field of the Invention

The present invention relates to an automatic cleaner for a pressing device, and the pressing device having the automatic cleaner.

2. Description of Related Art

In pressing devices that apply working, such as press-fitting or swaging, to workpieces, crumbs are produced during the working. To remove the crumbs during pressing, a technology in which an air ejector is provided in the pressing device, as a cleaner means, is known (for example, refer to Japanese Unexamined Patent Publication (Kokai) No. 8-174110).

SUMMARY OF THE INVENTION

In the pressing device, if a press member that is moved up and down, relative to the workpiece, to press the workpiece is not cleaned at regular time intervals, crumbs get into a gap between the press member and the workpiece. Thus, the workpiece is sometimes lifted up together with the rising press member, or the workpiece is sometimes lifted up without being separated from the press member, owing to a larger frictional force between the press member and the workpiece than gravity applied to the workpiece. This may hinder sequential operation of the pressing device. Such a problem of the pressing device is desired to be eliminated.

An aspect of the present disclosure is an automatic cleaner for a pressing device having a pressing unit that can reciprocate between a pressing position for pressing a workpiece and an apart position apart from the pressing position. The automatic cleaner includes a separating structure configured to separate the workpiece from the pressing unit; a cleaning member; and a drive mechanism configured to move the separating structure and the cleaning member back and forth, relative to the pressing unit, in accordance with movement of the pressing unit. In this structure, the drive mechanism is configured to make the separating structure drop the workpiece, after being worked, from the pressing unit, and to make the cleaning member clean the pressing unit, in accordance with the movement of the pressing unit.

Another aspect of the present disclosure is a pressing device that includes the automatic cleaner according to the above aspect; the pressing unit; and a pressing unit moving mechanism configured to reciprocate the pressing unit between the pressing position and the apart position.

BRIEF DESCRIPTION OF THE DRAWINGS

The objects, features, and advantages of the present invention will be more apparent from the following description of an embodiment accompanying with the attached drawings. In the attached drawings.

DETAILED DESCRIPTION

An embodiment of the present invention will be described below with reference to the attached drawings.

In all the drawings, corresponding components are indicated with the same reference numerals. For ease of understanding, the scales of the drawings are modified in an appropriate manner. The embodiment shown in the drawings is just an example to embody the present invention, and the present invention is not limited to this embodiment.

Figure 1:
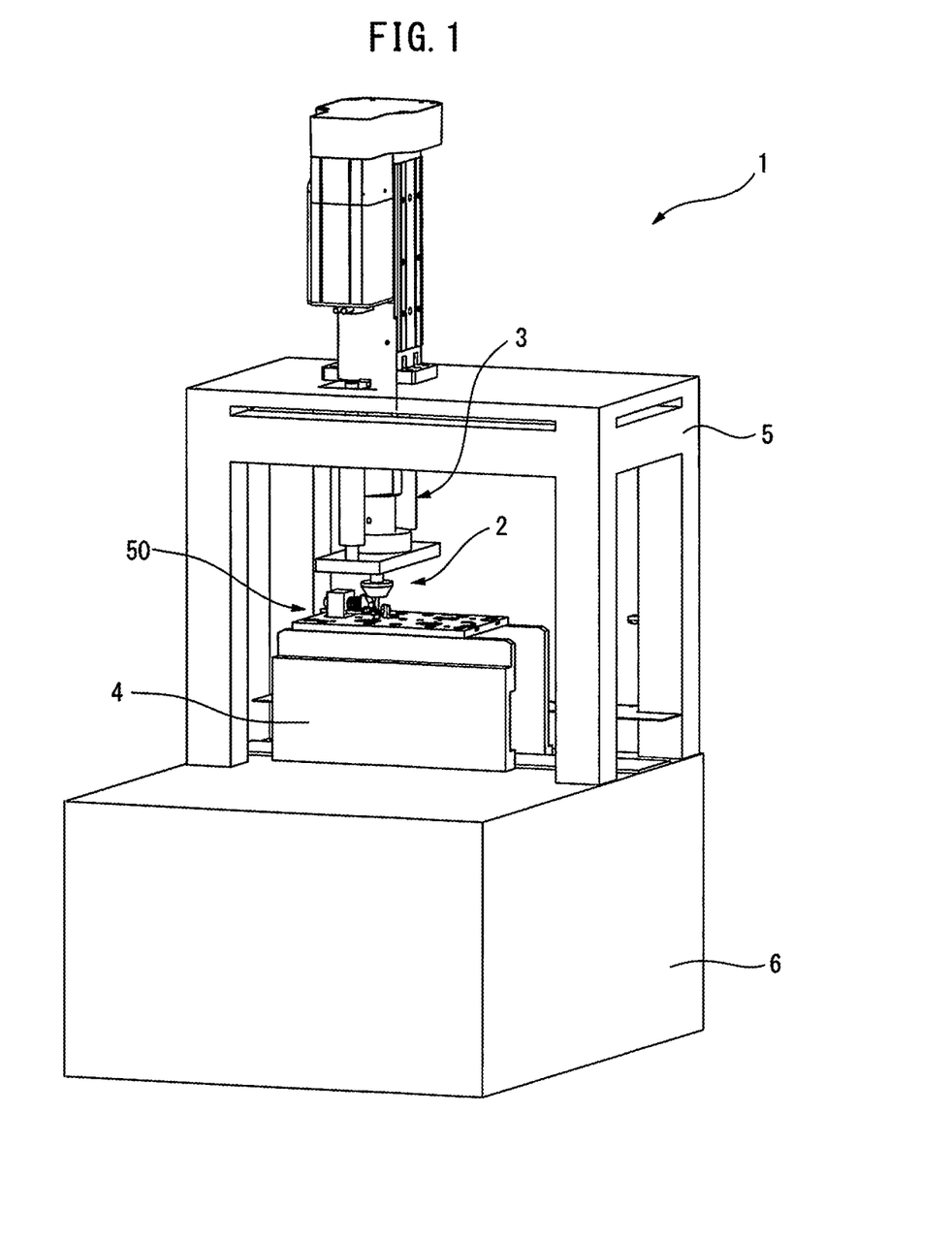
FIG. 1 is a perspective view showing the schematic structure of a pressing device according to an embodiment.

FIG. 1 is a perspective view showing the schematic structure of a pressing device 1 according to an embodiment. As shown in FIG. 1, the pressing device 1 includes a pressing unit 2, an elevating mechanism 3, a workpiece support base 4, a frame 5, and a table 6. The frame 5 is secured on the table 6, and the workpiece support base 4 is also secured on the table 6. The elevating mechanism 3 is secured to the frame 5, and moves up and down the pressing unit 2 that applies a pressing force to a pressed component W. Note that, as the elevating mechanism 3, a generally-known drive mechanism that converts a rotation driving force of a servomotor into a reciprocating linear movement in a vertical direction by a ball screw mechanism may be used. The pressed component W is disposed on a top surface of the workpiece support base 4 under the pressing unit 2. A press bit 21 (refer to FIG. 2), which is a rod-shaped press member, is attached to a tip end portion of the pressing unit 2. In the above structure, since the elevating mechanism 3 moves down the press bit 21 of the pressing unit 2, the press bit 21 is pressed against the pressed component W to perform press working, such as press-fitting or swaging, on the pressed component W.

The pressing device 1 according to this embodiment has an automatic cleaning mechanism 50 for cleaning crumbs produced by working operation, such as press-fitting or swaging. As described below in detail with reference to FIGS. 2 to 4, the automatic cleaning mechanism 50 is configured to separate the pressed component W from the press bit 21 in synchronization with the reciprocating movement of the pressing unit 2 in the vertical direction, and further to clean a side surface and a bottom surface of the press bit 21 with a crumb cleaning brush 87.

Figure 2:
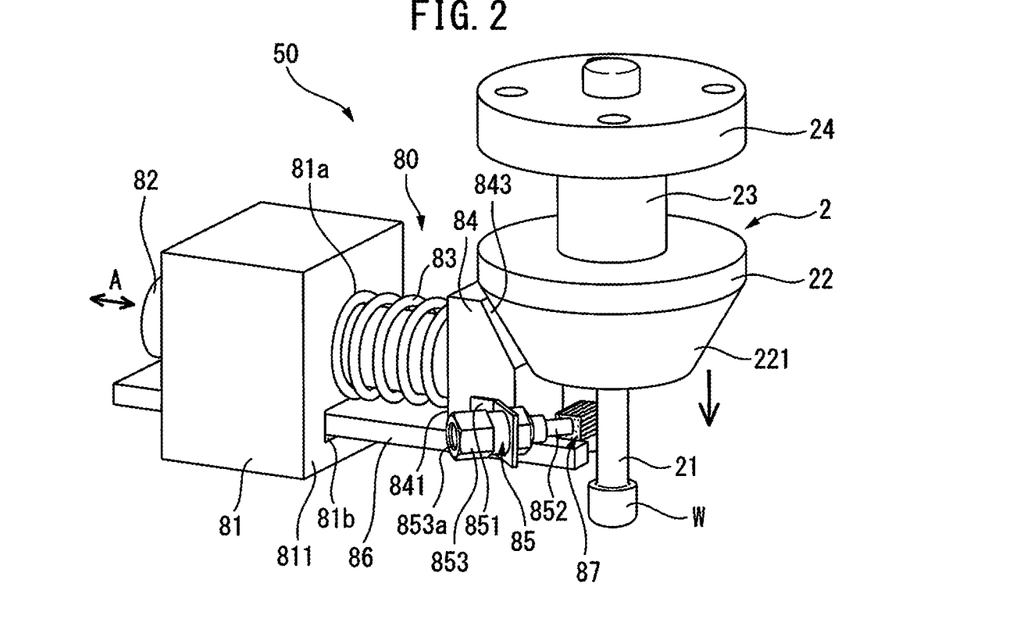
FIG. 2 is a drawing showing a state of moving down a pressing unit to a pressing position, in the operation of an automatic cleaning mechanism according to the embodiment.

FIG. 2 is perspective view of the whole structure of the automatic cleaning mechanism 50, and shows a state of moving down the pressing unit 2 to a pressing position (a state of performing a pressing operation on the pressed component W), in the operation of the automatic cleaning mechanism 50. As shown in FIG. 2, the automatic cleaning mechanism 50 has a spring expansion and contraction mechanism 80, a crumb removal nozzle 85, and a brush 87. In this structure, while the elevating mechanism 3 reciprocates the pressing unit 2 in the vertical direction, the spring expansion and contraction mechanism 80 moves back and force the crumb removal nozzle 85 and the brush 87 in a direction orthogonal to the movement direction of the pressing unit 2 (in the direction of an arrow A in FIG. 2), in synchronization with the reciprocating movement of the pressing unit 2 in the vertical direction. The crumb removal nozzle 85 may be configured to eject air all the time or at predetermined timing (for example, when a tip portion and its vicinity of the press bit 21 pass in front of the crumb removal nozzle 85). An aspirator (not illustrated) is disposed on the opposite side of the crumb removal nozzle 85, with respect to the press bit 21, so crumbs ejected by the air from the crumb removal nozzle 85 are sucked into the aspirator.

As shown in FIG. 2, the pressing unit 2 includes a shaft 23 secured to the elevating mechanism 3 through a flange portion 24, a spring expansion and contraction mechanism pressing member 22 attached to a lower end portion of the shaft 23, and the press bit 21 detachably attached to the spring expansion and contraction mechanism pressing member 22. The pressed component W to be worked by the pressing device 1 has an external diameter of, for example, 2 mm to 30 mm. As the press bit 21, a press bit corresponding to working of the pressed component W can be attached to the spring expansion and contraction mechanism pressing member 22. The spring expansion and contraction mechanism pressing member 22 has the shape of an inverted cone disposed such that an external diameter of the cone is reduced downward. The spring expansion and contraction mechanism pressing member 22 is secured to the lower end portion of the shaft 23, such that the central axis of the spring expansion and contraction mechanism pressing member 22 coincides with the central axis of the shaft 23. In other words, the spring expansion and contraction mechanism pressing member 22 has a tapered surface 221 that is tapered downward.

Figure 3:
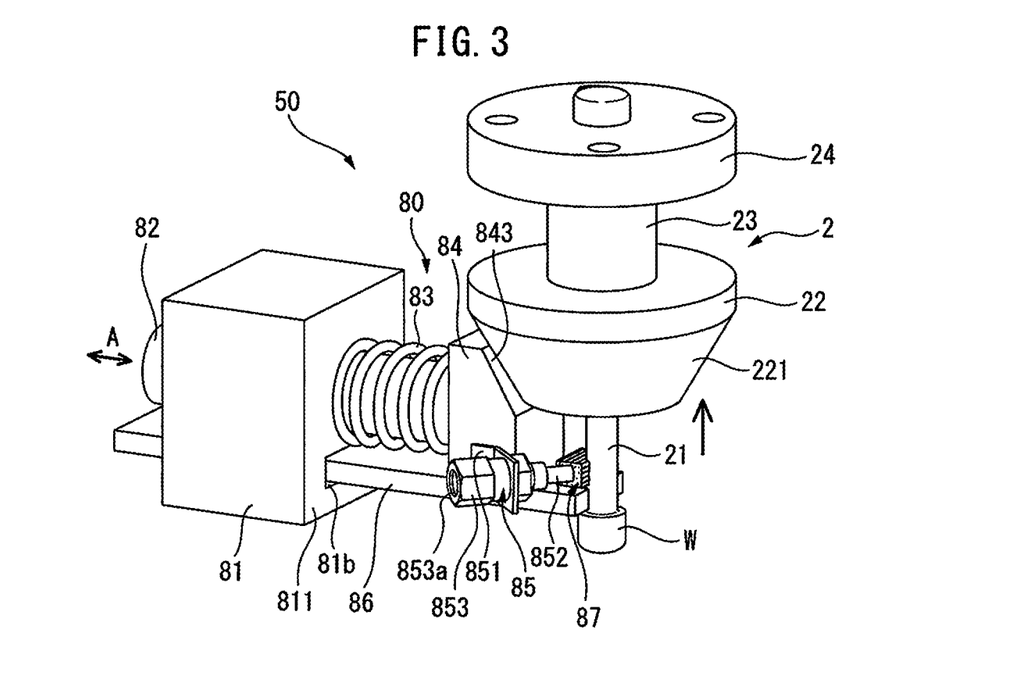
FIG. 3 is a drawing showing a state of separating a pressed component, in the operation of the automatic cleaning mechanism.
Figure 4:
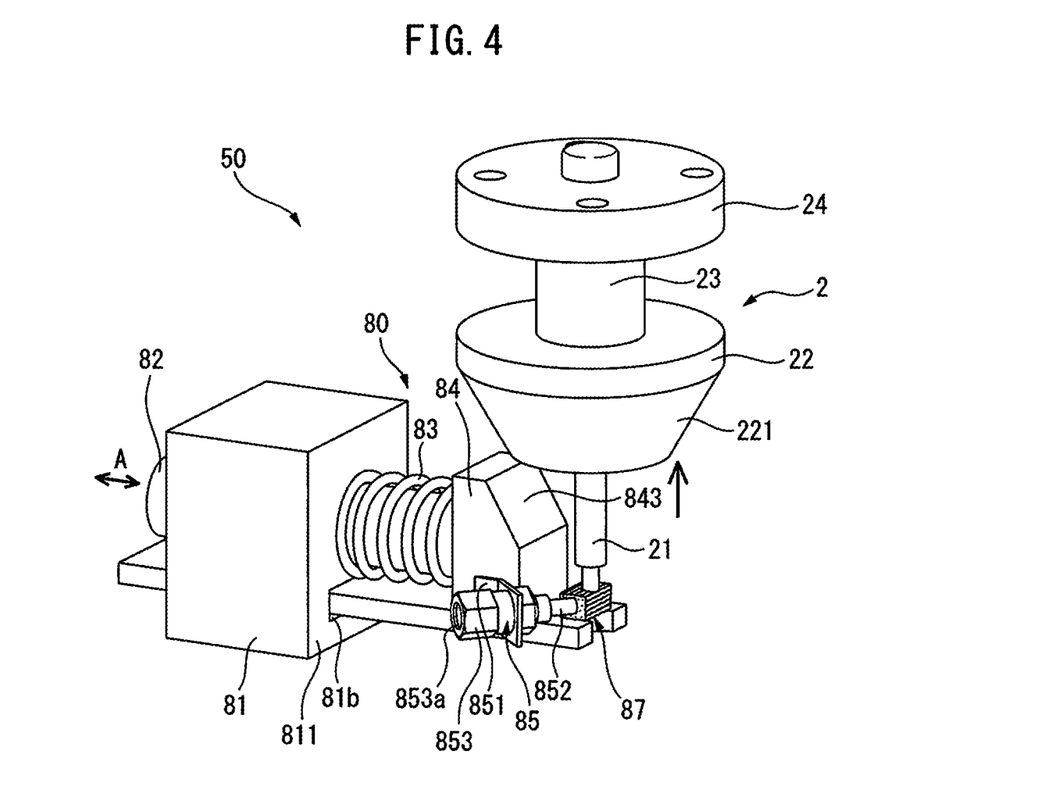
FIG. 4 is a drawing showing a state of moving a tapered surface of a spring expansion and contraction mechanism press member away from an inclined surface of a tip end piece of a spring expansion and contraction mechanism, in the operation of the automatic cleaning mechanism.

The spring expansion and contraction mechanism 80 includes a spring shaft support body 81 that is secured in position relative to the workpiece support base 4 of the pressing device 1, a spring support shaft 82, a coil spring 83, a tip end piece 84 secured to an end of the spring support shaft 82 on the side of the pressing unit 2, a support plate 86 for securely supporting the tip end piece 84 from beneath, the crumb removal nozzle 85 secured to the tip end piece 84, and the brush 87 secured to a tip end portion of the support plate 86 on the side of the pressing unit 2. Note that, the tip end piece 84 and the support plate 86 may be integrally formed as a movable member. In the spring shaft support body 81, a circular through hole 81*a* is formed so as to extend in the direction of the arrow A. The spring shaft support body 81 supports the spring support shaft 82 through the through hole 81*a* in a slidable manner in the direction of the arrow A. Furthermore, a rectangular through hole 81*b* is formed in the spring shaft support body 81 so as to extend in the direction of the arrow A. The spring shaft support body 81 supports the support plate 86 through the through hole 81*b* in a slidable manner in the direction of the arrow A. The coil spring 83 is disposed between a side surface 811 of the spring shaft support body 81 on the side of the pressing unit 2 and a side surface 841 of the tip end piece 84 on the side of the spring shaft support body 81. The coil spring 83 is supported by the spring support shaft 82, which penetrates through the center of the coil spring 83. The spring support shaft 82 and the support plate 86 have sufficient lengths to prevent the spring support shaft 82 and the support plate 86 from dropping out of the through holes 81*a* and 81*b* of the spring shaft support body 81, as shown in FIGS. 2 to 4, even if the spring support shaft 82 and the support plate 86 move back and force. The length of the coil spring 83 is set such that, when the pressing unit 2 is retracted upward and the coil spring 83 is in a free state without application of any external force, an inclined surface 843 of the tip end piece 84 is situated directly below the tapered surface 221 of the spring expansion and contraction mechanism pressing member 22, in the vertical direction (see FIG. 4).

The crumb removal nozzle 85 is secured to the tip end piece 84 by screwing or the like through a bracket 851, which is formed so as to protrude outside in the vicinity of the center of the crumb removal nozzle 85. A not-illustrated air tube is connected to a hole 853*a* of a proximal end 853 of the crumb removal nozzle 85. Air supplied from an external air compressor (not illustrated) through the hole 853*a* is ejected from a tip end portion 852 of the crumb removal nozzle 85 to the press bit 21.

Figure 5:
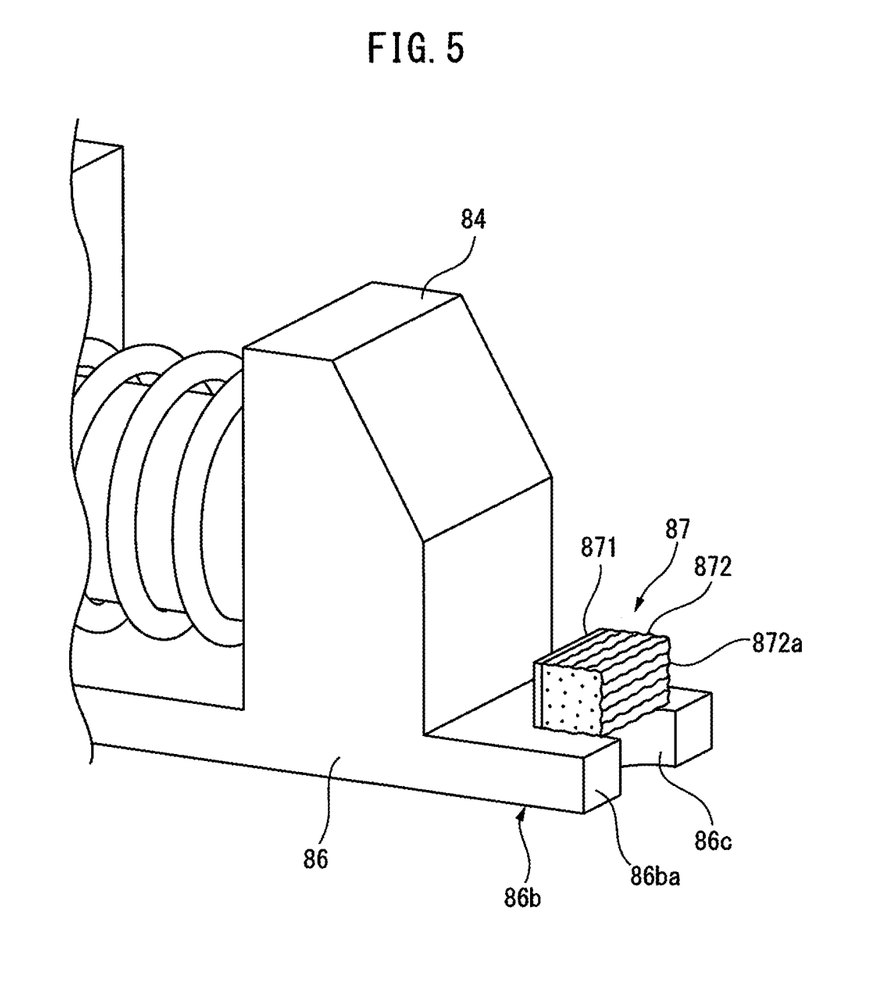
FIG. 5 is an enlarged view of a part of the automatic cleaning mechanism in the vicinity of a brush.
Figure 6:
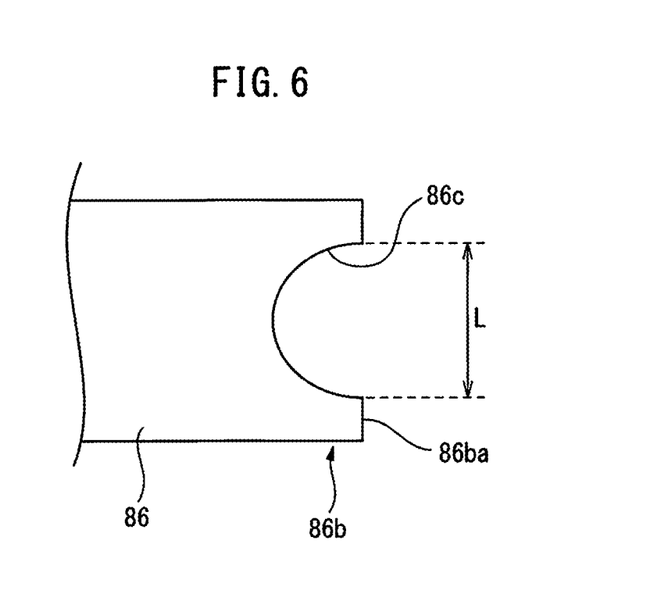
FIG. 6 is a top plan view of a tip end portion (a structure to separate the pressed component) of a support plate in the automatic cleaning mechanism.

FIG. 5 is an enlarged view of the brush 87 and its vicinity. Note that, FIG. 5 omits the crumb removal nozzle 85, for the convenience of explanation. As shown in FIG. 5, the brush 87 has such a structure that a brush body 872 is attached to one side surface of a metal base plate 871. The brush body 872 may be formed of, for example, plastic bristles, steel wool, or a flexible material having unevenness in its surface. The brush 87 is secured to a tip end portion 86*b* of the support plate 86 on the side of the pressing unit 2, by screwing or the like through the base plate 871, in a state that the base plate 871 is erected in the vertical direction and the brush body 872 faces toward the press bit 21. FIG. 6 is a top plan view of the tip end portion 86*b* of the support plate 86 on the side of the pressing unit 2. FIG. 6 omits the brush 87, for the sake of convenience in explanation. In FIG. 6, the right side corresponds to the side of the pressing unit 2. As shown in FIG. 6, a semicircular concave portion 86*c*, when viewed from above, is formed in the tip end portion 86*b* of the support plate 86. When the support plate 86 is moved forth to a position in the close vicinity of the pressing unit 2, the press bit 21 enters the concave portion 86*c*, in order to prevent interference between the support plate 86 and the press bit 21. The base plate 871 of the brush 87 is secured to the support plate 86 at a recessed portion of the concave portion 86*c* (refer to FIG. 5). The brush body 872 of the brush 87 has such a size that, in a state that the brush 87 is secured to the support plate 86, an end surface 872*a* of the brush body 872 on the side of the pressing unit 2 is slightly recessed on a back side (on the side of the tip end piece 84) from an end surface 86*b* a of the tip end portion 86*b* (refer to FIG. 5).

Returning to FIG. 2, a moving down operation of the pressing unit 2 will be described. First, the pressing unit 2 retracts upward, and the tapered surface 221 of the spring expansion and contraction mechanism pressing member 22 is apart upward from the inclined surface 843 of the tip end piece 84 of the spring expansion and contraction mechanism 80. When the pressing unit 2 is moved down from this state, the tapered surface 221 of the spring expansion and contraction mechanism pressing member 22 starts contacting the inclined surface 843 of the spring expansion and contraction mechanism 80. When the pressing unit 2 is further moved down, since the external diameter of the tapered surface 221 of the spring expansion and contraction mechanism pressing member 22 increases with height, the tip end piece 84 of the spring expansion and contraction mechanism 80 is depressed by the tapered surface 221 on the side of the spring shaft support body 81 against a biasing force of the coil spring 83. By moving down the pressing unit 2, the tip end portion of the press bit 21 presses the pressed component W, so that working is applied to the pressed component W. Note that, in a state that the tip end piece 84 of the spring expansion and contraction mechanism 80 is depressed by the tapered surface 221 of the spring expansion and contraction mechanism pressing member 22, as shown in FIG. 2, the coil spring 83 is in a contracted state, and therefore, the tip end piece 84 is biased toward the pressing unit 2 by a biasing force from the coil spring 83.

Next, referring to FIG. 3, a separating operation of the pressed component W will be described. As shown in FIG. 2, when the working is completely applied to the pressed component W, the pressing unit 2 starts moving up. The tapered surface 221 of the spring expansion and contraction mechanism pressing member 22 thereby starts moving up, relative to the inclined surface 843 of the tip end piece 84 of the spring expansion and contraction mechanism 80. Since the spring expansion and contraction mechanism pressing member 22 is formed such that its external diameter decreases with a decrease in height, while the spring expansion and contraction mechanism pressing member 22 moves up, the tip end piece 84 of the spring expansion and contraction mechanism 80 starts moving forth on the side of the pressing unit 2, by the biasing force of the coil spring 83. At this time, the brush body 872 of the brush 87 contacts the press bit 21, and removes crumbs adhering to a side surface of the press bit 21. Note that, in a state of FIG. 3 in which the pressing unit 2 is moving up, the press bit 21 enters into the concave portion 86c of the tip end portion 86b of the support plate 86, and therefore, the press bit 21 does not interfere with the tip end portion 86b of the support plate 86. Accordingly, the press bit 21 is smoothly moved up in the concave portion 86c.

When the pressing unit 2 is moved up to a certain degree, as shown in FIG. 3, the pressed component W is snagged on the tip end portion 86b of the support plate 86, and drops from the press bit 21. Explaining this respect for more detail, the concave portion 86c of the tip end portion 86b of the support plate 86 has a width L larger than the external diameter of the press bit 21, and smaller than the external diameter of the pressed component W. According to this structure, although the press bit 21 can be smoothly moved in the concave portion 86c, the pressed component W cannot pass through the concave portion 86c. The pressed component W is thereby snagged on the tip end portion 86b, and drops off. In other words, the tip end portion 86b of the support plate 86 functions as a separating structure that separates the pressed component W from the press bit 21.

When the pressing unit 2 is further moved up from the state of FIG. 3, as shown in FIG. 4, the tapered surface 221 of the spring expansion and contraction mechanism pressing member 22 is moved away from the inclined surface 843 of the tip end piece 84 of the spring expansion and contraction mechanism 80. Therefore, the tip end piece 84 of the spring expansion and contraction mechanism 80 further moves forth on the side of the press bit 21. At this time, the brush body 872 of the brush 87 removes dirt and crumbs adhering to a bottom surface of the press bit 21, at its top surface. The crumbs removed from the press bit 21 are blown by air from the crumb removal nozzle 85, and sucked into the aspirator (not illustrated) that is disposed opposite the crumb removal nozzle 85, with respect to the position of the press bit 21.

When the pressing unit is sufficiently moved up from the state of FIG. 4, a sequential operation of the press working and the cleaning on the pressed component W is completed. The operation of FIGS. 2 to 4 is performed on a next pressed component W.

As described above, according to the present invention, the automatic cleaning mechanism 50 allows reliably dropping the pressed component W, after being worked, from the press bit 21, and automatically cleaning the press bit 21. In the automatic cleaning mechanism 50, the movement of the pressing unit 2 in the vertical direction is converted into a movement in a horizontal direction orthogonal to the vertical direction, with the use of the biasing force of the coil spring 83, and thereby the brush 87 is moved back and force toward the press bit 21, in order to reliably clean the side surface and the bottom surface of the press bit 21. This eliminates the need for providing a separate motive power mechanism and a control program to drive the brush 87. In the press working, such as press-fitting and swaging, thin film-shaped crumbs sometimes adhere to the bottom surface of the press bit 21. According to this embodiment, it is possible to reliably remove and clean the crumbs.

The automatic cleaning mechanism 50 is configured to reliably rub the side surface and the bottom surface of the press bit 21 with the brush 87 to remove crumbs therefrom, and to blow off the removed crumbs by air and suck the crumbs, while the press bit 21 moves up. Therefore, for example, it is possible to reliably clean the press bit 21, in comparison with a mechanism that cleans the crumbs only by an air blow.

Since the width L of the semicircular concave portion 86c of the tip end portion 86b of the support plate 86 is set at a value that is larger than the external diameter of the press bit 21 attached to the pressing unit 2 and is smaller than the external diameter of the pressed component W, the pressed component W adhering to the press bit 21, after being applied to working, can be reliably separated from the press bit 21.

The embodiment of the present invention is described above, but it is apparent for those skilled in the art that the embodiment can be variously corrected or modified without departing from the scope of the invention described below.

For example, in the above embodiment, the brush 87 and the tip end portion 86b of the support plate 86, which functions as the separating structure, are moved back and forth by the expansion and contraction mechanism using the biasing member. However, instead of this structure, the brush 87 and the tip end portion 86b of the support plate 86, functioning as the separating structure, may be driven using a power source, e.g. an air cylinder, to operate in the same manner as in the above embodiment.

Figure 7:
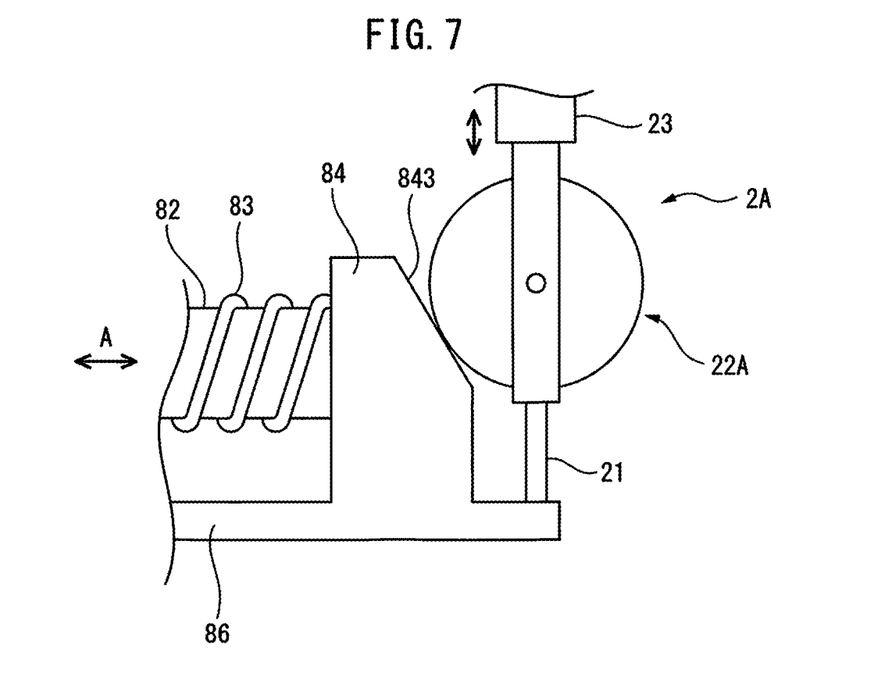
FIG. 7 is a drawing showing a modification example of the automatic cleaning mechanism in which a roller member is used, instead of the spring expansion and contraction mechanism press member having the tapered surface.

In the above embodiment, the tip end piece 84 of the spring expansion and contraction mechanism 80 and the brush 87 are moved back and forth, relative to the pressing unit 2, by sliding the tapered surface 221 of the spring expansion and contraction mechanism pressing member 22 and the inclined surface 843 of the tip end piece 84 of the spring expansion and contraction mechanism 80 on each other, but the present invention is not limited to this example. For example, any one of the tip end piece 84 and the spring expansion and contraction mechanism pressing member 22 may be constituted of a roller member. Also in this case, the tip end piece 84 and the brush 87 of the spring expansion and contraction mechanism 80 can be moved back and forth, relative to the pressing unit 2, in accordance with the vertical movement of the pressing unit 2. FIG. 7 is a side view showing an example of the structure of using a roller member 22A that is rotatably secured to the shaft 23, instead of the spring expansion and contraction mechanism pressing member 22. Note that, FIG. 7 omits the brush 87 and the crumb removal nozzle 85, for the sake of convenience in explanation. In the example of the structure shown in FIG. 7, while a pressing unit 2A moves up and down, an outer peripheral surface of the roller member 22A contacts the inclined surface 843 of the tip end piece 84, while being rotated. Also in this case, as in the case of the above embodiment, the tip end piece 84 of the spring expansion and contraction mechanism 80 is moved back and force in the direction of the arrow A, relative to the pressing unit 2A, in accordance with the vertical movement of the pressing unit 2A.

In the above embodiment, the coil spring 83 is used as a biasing member that biases the brush 87 and the tip end portion 86b of the support plate 86, but an example of the biasing member is not limited to this. As the biasing member, an elastic member of any type or an oil damper may be used instead.

In the above embodiment, one set of the spring expansion and contraction mechanism 80 and the brush 87 is provided, but a second set of a spring expansion and contraction mechanism and a brush may be provided opposite the spring expansion and contraction mechanism 80 and the brush 87, with respect to the pressing unit 2. The second set of the spring expansion and contraction mechanism and the brush may be moved back and force, relative to the pressing unit 2, in the same manner as the set of the spring expansion and contraction mechanism 80 and the brush 87. In this case, since the press bit 21 is cleaned with the two brushes from both sides, the press bit can be cleaned further reliably.

To solve the problem of the present disclosure, the following various aspects and effects thereof can be provided. Note that, in the following description of the aspects, numbers inside parentheses correspond to the reference numerals of the drawings of the present disclosure.

For example, a first aspect of the present disclosure is an automatic cleaner (50) for a pressing device having a pressing unit that can reciprocate between a pressing position for pressing a workpiece and an apart position apart from the pressing position. The automatic cleaner (50) includes a separating structure (86b) configured to separate the workpiece (W) from the pressing unit (2); a cleaning member (87); and a drive mechanism (80) configured to move the separating structure (86b) and the cleaning member (87) back and forth, relative to the pressing unit (2), in accordance with movement of the pressing unit (2). The drive mechanism (80) is configured to make the separating structure (86b) drop the workpiece (W), after being worked, from the pressing unit (2), and to make the cleaning member (87) clean the pressing unit (2), in accordance with the movement of the pressing unit (2).

According to the first aspect, it is possible to reliably drop the workpiece, after being worked, from the pressing unit, and to reliably clean the pressing unit.

According to a second aspect of the present disclosure, in the automatic cleaner (50) according to the first aspect, while the pressing unit (2) moves close to the pressing position, the drive mechanism (80) moves the separating structure (86b) and the cleaning member (87) back from the pressing unit (2). While the pressing unit (2) moves away from the pressing position, the drive mechanism (80) moves the separating structure (86b) and the cleaning member (87) forth to the pressing unit (2).

According to a third aspect of the present disclosure, in the automatic cleaner (50) according to the first or second aspect, the drive mechanism (80) includes a biasing member (83); and a movable member (84, 86) biased by the biasing member (83) toward the pressing unit (2), the movable member (84, 86) being moved back and force, relative to the pressing unit (2), in accordance with the movement of the pressing unit (2). The pressing unit (2) includes a pressing unit side inclined surface (221) that is inclined with respect to a direction of the reciprocating movement of the pressing unit (2). By sliding the pressing unit side inclined surface (221) and a part of the movable member on each other, in accordance with the movement of the pressing unit (2), the movable member (84, 86) is moved back and force relative to the pressing unit (2).

According to a fourth aspect of the present disclosure, in the automatic cleaner (50) according to the first or second aspect, the drive mechanism (80) includes a biasing member (83); and a movable member (84, 86) biased by the biasing member (83) toward the pressing unit (2), the movable member (84, 86) being moved back and force, relative to the pressing unit (2), in accordance with the movement of the pressing unit (2). The movable member (84, 86) includes a movable member side inclined surface (843) that is inclined with respect to a direction of the movement of the movable member (84, 86). By sliding a part of the pressing unit (2) and the movable member side inclined surface (843) of the movable member (84, 86) on each other, in accordance with the movement of the pressing unit (2), the movable member (84, 86) is moved back and force relative to the pressing unit (2).

According to a fifth aspect of the present disclosure, in the automatic cleaner (50) according to the fourth aspect, the pressing unit (2) has a pressing unit side inclined surface (221) that is inclined with respect to a direction of the reciprocating movement of the pressing unit (2), as the part of the pressing unit (2). The movable member (84, 86) is moved back and forth, relative to the pressing unit (2), in accordance with the movement of the pressing unit (2), by sliding of the pressing unit side inclined surface (221) and the movable member side inclined surface (843) on each other.

According to a sixth aspect of the present disclosure, in the automatic cleaner (50) according to the third or fifth aspect, the pressing unit (2) includes a rod-shaped press member (21) configured to press the workpiece (W); and a press member support body (22) configured to support the press member (21), the press member support body (22) being formed in a tapered manner toward the workpiece. The pressing unit side inclined surface (221) is an outer peripheral surface of the press member support body.

According to a seventh aspect of the present disclosure, in the automatic cleaning mechanism (50) according to any one of the first to fifth aspects, the pressing unit (2) has a rod-shaped press member (21) configured to press the workpiece (W). While the press member (21) moves away from the pressing position, the separating structure (86b) is moved close to the press member (21) and contacts the workpiece (W), so as to drop the workpiece (W) adhering to the press member (21) from the press member (21).

According to an eight aspect of the present disclosure, in the automatic cleaner (50) according to the seventh aspect, the separating structure (86b) has a concave portion (86c) recessed such that, when the press member (21) moves away from the pressing position and the separating structure (86b) is in a state of being closed to the press member (21), the separating structure (86b) does not interfere with the press member (21).

According to a ninth aspect of the present disclosure, in the automatic cleaner (50) according to the seventh or eighth aspect, while the press member (21) moves away from the pressing position, the cleaning member (87) contacts the press member (21) and cleans the press member (21).

According to a tenth aspect of the present disclosure, in the automatic cleaner (50) according to the ninth aspect, while the press member (21) moves away from the pressing position, the cleaning member (7) cleans an outer peripheral surface and an end surface, on a side of the workpiece, of the press member (21).

According to an eleventh aspect of the present disclosure, in the automatic cleaner (50) according to any one of the first to tenth aspects, the cleaning member (87) is a brush.

A twelfth aspect of the present disclosure, in the automatic cleaner (50) according to any one of the first to eleventh aspects, further includes an air blowing mechanism configured to blow air to the pressing unit in the pressing position.

A thirteenth aspect of the present disclosure is a pressing device (1) that includes the automatic cleaner (50) according to any one of the first to twelfth aspects; the pressing unit; and a pressing unit moving mechanism (3) configured to reciprocate the pressing unit between the pressing position and the apart position.

The invention claimed is:

1. An automatic cleaner for a pressing device having a pressing unit that can reciprocate between a pressing position for pressing a workpiece and an apart position apart from the pressing position, the automatic cleaner comprising:
   a separating structure configured to separate the workpiece from the pressing unit;
   a cleaning member; and
   a drive mechanism configured to move the separating structure and the cleaning member back and forth, relative to the pressing unit, in accordance with movement of the pressing unit, wherein
   the drive mechanism is configured to make the separating structure drop the workpiece, after being worked, from the pressing unit, and to make the cleaning member clean the pressing unit, in accordance with the movement of the pressing unit,
   wherein
   the drive mechanism includes:
      a biasing member; and
      a movable member biased by the biasing member toward the pressing unit, the movable member being moved back and forth, relative to the pressing unit, in accordance with the movement of the pressing unit,
   the pressing unit includes a pressing unit side inclined surface that is inclined with respect to a direction of the reciprocating movement of the pressing unit, and
   by sliding the pressing unit side inclined surface and a part of the movable member on each other, in accordance with the movement of the pressing unit, the movable member is moved back and forth relative to the pressing unit.

2. An automatic cleaner for a pressing device having a pressing unit that can reciprocate between a pressing position for pressing a workpiece and an apart position apart from the pressing position, the automatic cleaner comprising:
   a separating structure configured to separate the workpiece from the pressing unit;
   a cleaning member; and
   a drive mechanism configured to move the separating structure and the cleaning member back and forth, relative to the pressing unit, in accordance with movement of the pressing unit, wherein
   the drive mechanism is configured to make the separating structure drop the workpiece, after being worked, from the pressing unit, and to make the cleaning member clean the pressing unit, in accordance with the movement of the pressing unit,
   wherein
   the drive mechanism includes:
      a biasing member; and
      a movable member biased by the biasing member toward the pressing unit, the movable member being moved back and forth, relative to the pressing unit, in accordance with the movement of the pressing unit,
   the movable member includes a movable member side inclined surface that is inclined with respect to a direction of the movement of the movable member, and
   by sliding a part of the pressing unit and the movable member side inclined surface of the movable member on each other, in accordance with the movement of the pressing unit, the movable member is moved back and forth relative to the pressing unit.

3. The automatic cleaner according to claim 1, wherein
while the pressing unit moves close to the pressing position, the drive mechanism moves the separating structure and the cleaning member back from the pressing unit, and
while the pressing unit moves away from the pressing position, the drive mechanism moves the separating structure and the cleaning member towards the pressing unit.

4. The automatic cleaner according to claim 2, wherein
the part of the pressing unit is a pressing unit side inclined surface that is inclined with respect to a direction of the reciprocating movement of the pressing unit, and
the movable member is moved back and forth, relative to the pressing unit, in accordance with the movement of the pressing unit, by sliding of the pressing unit side inclined surface and the movable member side inclined surface on each other.

5. The automatic cleaner according to claim 1, wherein
the pressing unit includes:
   a rod-shaped press member configured to press the workpiece; and
   a press member support body configured to support the press member, the press member support body being formed in a tapered manner toward the workpiece, and
the pressing unit side inclined surface is an outer peripheral surface of the press member support body.

6. The automatic cleaner according to claim 1, wherein
the pressing unit has a rod-shaped press member configured to press the workpiece, and
while the press member moves away from the pressing position, the separating structure is moved close to the press member and contacts the workpiece, so as to drop the workpiece adhering to the press member from the pressing unit.

7. The automatic cleaner according to claim 6, wherein
the separating structure has a concave portion recessed such that, when the press member moves away from the pressing position and the separating structure is in a state of being close to the press member, the separating structure does not interfere with the press member.

8. The automatic cleaner according to claim 6, wherein while the press member moves away from the pressing position, the cleaning member contacts the press member and cleans the press member.

9. The automatic cleaner according to claim 8, wherein while the press member moves away from the pressing position, the cleaning member cleans an outer peripheral surface and an end surface, on a side of the workpiece, of the press member.

10. The automatic cleaner according to claim 1, wherein the cleaning member is a brush.

11. The automatic cleaner according to claim 1, further comprising an air blowing mechanism configured to blow air to the pressing unit in the pressing position.

12. A pressing device comprising:
   the automatic cleaner according to claim 1;
   the pressing unit; and
   a pressing unit moving mechanism configured to reciprocate the pressing unit between the pressing position and the apart position.

\* \* \* \* \*